United States Patent
Bogan et al.

(10) Patent No.: US 8,845,435 B2
(45) Date of Patent: Sep. 30, 2014

(54) TOY OBJECT AND TASK-CONDITIONAL REWARD

(76) Inventors: Michael Bogan, Indianapolis, IN (US); Erin Bogan, Indianapolis, IN (US)

(*) Notice: Subject to any disclaimer, the term of this patent is extended or adjusted under 35 U.S.C. 154(b) by 369 days.

(21) Appl. No.: 13/370,844

(22) Filed: Feb. 10, 2012

(65) Prior Publication Data

US 2012/0208641 A1    Aug. 16, 2012

Related U.S. Application Data

(60) Provisional application No. 61/441,782, filed on Feb. 11, 2011.

(51) Int. Cl.
| | |
|---|---|
| A63F 9/24 | (2006.01) |
| G06Q 30/06 | (2012.01) |
| G09B 19/00 | (2006.01) |
| G06Q 30/02 | (2012.01) |

(52) U.S. Cl.
CPC ............... *G09B 19/00* (2013.01); *G06Q 30/06* (2013.01); *G06Q 30/0207* (2013.01)
USPC ................. 463/42; 463/43; 463/47; 446/268; 446/491

(58) Field of Classification Search
USPC ........................... 446/175, 268; 434/236, 433
See application file for complete search history.

(56) References Cited

U.S. PATENT DOCUMENTS

| | | | |
|---|---|---|---|
| 6,729,884 B1 | 5/2004 | Kelton et al. | |
| 7,442,108 B2 | 10/2008 | Ganz | |
| 2005/0114444 A1 | 5/2005 | Brown et al. | |
| 2005/0192864 A1 | 9/2005 | Ganz | |
| 2008/0214089 A1 | 9/2008 | Vermac et al. | |
| 2008/0270240 A1* | 10/2008 | Chu | ............................. 705/14 |
| 2010/0107214 A1 | 4/2010 | Ganz | |
| 2010/0211531 A1 | 8/2010 | Roberts et al. | |
| 2011/0258684 A1 | 10/2011 | Ganz | |
| 2012/0123835 A1 | 5/2012 | Chu | |
| 2012/0215667 A1* | 8/2012 | Ganz et al. | ................... 705/27.2 |

OTHER PUBLICATIONS

Author Unknown, "Boom Boom! Revolution," Boom Boom! Cards, Aug. 29, 2010, 6 pages. Accessed at: http://web.archive.org/web/20100727215918.
Author Unknown, "Uglydoll Official Online Store," Shopatron Inc., Dec. 27, 2010, 2 pages. Accessed at: http://web.archive.org/web/20111125162602.
U.S. Appl. No. 13/857,342, Toy Object and Task-Conditional Reward filed Apr. 5, 2013.
Author Unknown, "Karito Kids Play More Than 'House'—Karito Kids Play 'World,'" Karito Kids, Press Release, Apr. 28, 2008, 3 pages.
Author Unknown, "Welcome to Custard 'n Jelly!," Custard 'n Jelly, Dec. 27, 2010, 1 pages. Accessed at: https://web.archive.org/web/20100801000000*/http://www.custardnjelly.com/home.html.

\* cited by examiner

*Primary Examiner* — William Brewster
*Assistant Examiner* — Alex F. R. P. Rada, II
(74) *Attorney, Agent, or Firm* — Kilpatrick Townsend & Stockton LLP

(57) ABSTRACT

In some embodiments, a method of distributing toy objects is provided. The method includes: providing a toy object and a task identifier, the task identifier identifying a task; receiving, via a website, task-completion input from a user; associating the user with a profile, the profile being associated with the toy object; updating the profile to indicate that the task had been performed; identifying reward criteria; determining whether the reward criteria was met; and, upon determining that the reward criteria was met, initializing distribution of a physical reward.

7 Claims, 11 Drawing Sheets

TOY OBJECT AND TASK-CONDITIONAL REWARD

CROSS-REFERENCES TO RELATED APPLICATIONS

The present application is a non-provisional patent application, claiming the benefit of priority of U.S. Provisional Application No. 61/441,782, filed on Feb. 11, 2011, entitled, "A Toy System and Method Comprising a Positive Message and an Assigned Task," which is hereby incorporated by reference in its entirety.

BACKGROUND

Children's toys are a large industry. Frequently, adults purchase these toys for children, e.g., for holidays or birthdays. A toy may be purchased in order to provide a child with entertainment. Alternatively, or in addition, a toy may also serve another purpose. For example, educational toys may improve a child's knowledge about a particular subject matter. Nevertheless, a toy is most often designed only to immediately amuse a child owner of the toy. Relatively few toys exist that are designed to encourage self-confidence, social ties and social responsibility.

BRIEF SUMMARY

In some embodiments, a toy (e.g., a plush creature) is provided to a recipient (e.g., who purchased the toy). One or more task-defining elements (e.g., a task-defining card) may also be provided. For example, a toy may be provided with a card that includes an instruction to say "hello" to a stranger. The recipient may enter task-completing input into a website (e.g., by entering a code on a task-defining card). A computer server may store a set of profiles. Each profile may be associated with, e.g., a person and/or a toy object. The profile may include, e.g., a shipping address, website log-in information, purchase history, website interaction history (e.g., past indications of reward completions), and/or an association with a toy object. Based on input received from the recipient, the server may associate the recipient with a profile of one of the set of people and/or with a particular toy object. Additionally, the server may estimate that the recipient completed a specific task or a task generally. Task-completion data in the profile may be updated accordingly. Reward criteria may be defined, e.g., as a number of completed tasks, a specific set of completed tasks, etc. Task-completion data in the profile may be compared to reward criteria. If it is determined that the criteria has been met, reward distribution may be initiated (e.g., by informing a user of reward availability, allowing a user to choose his reward, requesting a confirmation for reward issuance, etc.) The reward may be a physical reward and/or related to the toy (e.g., an accessory of the toy object).

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

In some embodiments of the invention, a method of distributing toy objects is provided. The method includes providing a toy object and a task identifier, the task identifier identifying a task. The method also includes receiving, at a computer system via a website, task-completion input from a user. The method further includes associating the user with a profile, the profile being associated with the toy object. The method still further includes updating the profile to indicate that the task had been performed. The method includes identifying a reward criteria. The method also includes: determining whether the reward criteria was met by the user completing the task; and, upon determining that the reward criteria was met, initializing distribution of a physical reward to the user. The task-completion input may include a code. The code may be provided with the toy object and with the task identifier. The initializing distribution may include sending an electronic message to a distribution center to ship the physical reward. The toy object may include a plush creature and the physical reward comprises an accessory for the plush creature. The determining whether the reward criteria was met may include determining whether a specific task had been performed. The task may involve an act to be performed for an organization or a set number of individuals. The task comprises an act of good-will.

In some embodiments of the invention, a toy system is provided. The toy system includes: a toy object; one or more task identifiers, each task identifier identifying a task; one or more reward codes, wherein user entry of the one or more reward codes into a website indicates completion of the task, and an indicator that the one or more reward codes are to be entered into a website upon completion of the identified task and that a recipient may progress towards earning a physical reward based by completing the one or more tasks and entering the one or more reward codes. The toy object may include a toy resembling a human, an animal, a cartoon character, an inanimate object, or an imaginary creature. The toy system may further include a computer system configured to: receive the one or more reward codes from a user; associate the one or more reward codes with an identifier of the toy object; and initiate a distribution of the physical reward. The task may include an act of good-will. The toy system may further include a concealor to conceal the task identifier. Performance of the task may be substantially un-verifiable by a party maintaining the website.

In some embodiments of the invention, a method is provided. The method includes: associating a toy-object identifier with a task identifier in at least one database coupled with a computer system, the toy-object identifier identifying a toy object, the task identifier identifying a task to be performed by a recipient of the toy object; associating the task identifier with a code in the at least one database; providing the recipient with instructions that the recipient should enter the code into a webpage upon completion of the task; receiving at the computer system, via the webpage, the code; determining that the recipient has earned a physical accessory of the toy object, wherein the determining is based at least partly on the receiving of the code; and initiating distribution of the physical accessory of the toy object to the recipient. The method may further include: associating the toy-object identifier with a second task identifier, the second task identifier identifying a second task to be performed by the recipient of the toy object; associating the second task identifier with a second code; indicating that the recipient should enter the second code into a webpage upon completion of the second task; and receiving, via the webpage, the second code, wherein the determining that the recipient has earned the physical accessory of the toy object is based at least partly on the receiving of the second code. The code may be uniquely associated with a single toy-object identifier. The method may further include identifying a profile based on the received code. The method may further include presenting representations of a plurality of physical accessories; and receiving input selecting one of the plurality of physical accessories, wherein the physical accessory for which distribution is initiated is the selected one of the plurality of physical accessories. The task may include a socially responsible action.

BRIEF DESCRIPTION OF THE DRAWINGS

Illustrative embodiments of the present invention are described in detail below with reference to the following drawing figures.

DETAILED DESCRIPTION OF THE INVENTION

Figure 1:
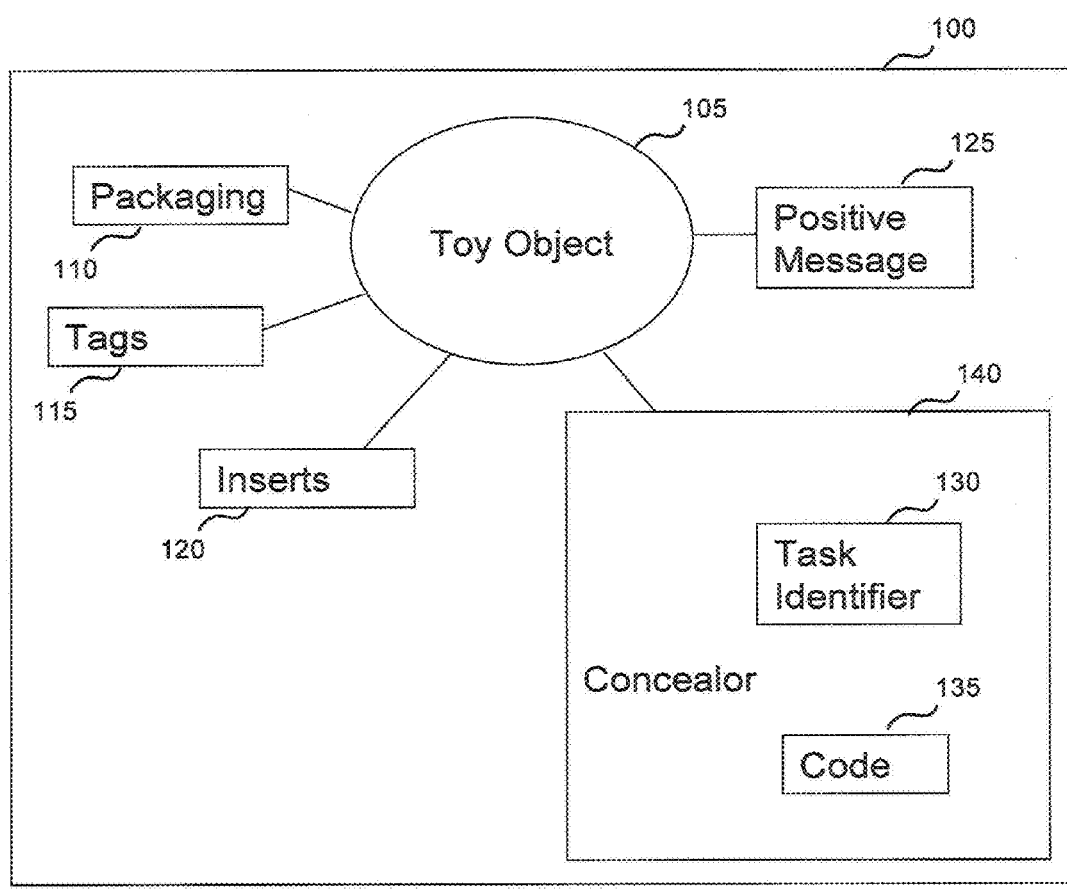
FIG. 1 illustrates a block-diagram of a toy system, in accordance with some embodiments of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In some embodiments, a toy (e.g., a plush creature) is provided. One or more task-defining elements (e.g., a task-defining card) may also be provided. For example, a toy may be provided with a card that includes an instruction or task to say "hello" to a stranger. A recipient who receives the toy may log onto a website and indicate that he completed the task (e.g., by entering a code on a task-defining card). A computer server may store profiles for each of a set of people (e.g., purchasers and/or recipients). The profile may include, e.g., a shipping address, website log-in information, purchase history, website interaction history (e.g., past indications of reward completions), and/or an association with a toy. Based on input received from the recipient, the server may associate the recipient with a profile of one of the set of people and/or with a particular toy. Additionally, the server may identify a particular task and/or estimate that the one of the set of people had completed a task. Task-completion data in the profile may be updated to reflect completion of the task. Reward criteria may be defined, e.g., as a number of completed tasks, a specific set of completed tasks, etc. Task-completion data in the profile may be compared to reward criteria. If it is determined that the criteria has been met, a user may be able to: be informed of reward availability, choose his reward, confirm issuance of a reward, etc. The reward may be a physical reward and/or related to the toy (e.g., an accessory of the toy). Instructions may be sent to a distribution center to issue the reward to the recipient, a non-profit entity and/or a person in need.

In one embodiment, a toy set is provided to a recipient (e.g., after the recipient purchases the set in a store or receives the set as a gift from a purchaser). The toy set includes a plush creature, one or more task identifiers, one or more reward codes, and instructions. The task identifier may include a package insert with printed instructions identifying a task to be performed. The reward codes may be on the same insert or a different insert. The instructions may instruct the recipient to perform the identified task and to subsequently enter the reward codes into a specific website. The instructions may also indicate that the a reward may thereafter be issued. A computer system may host the website and/or store an identifier of the plush creature (e.g., a serial number), and of the provided one or more reward codes. After the computer system receives the one or more reward codes, it may initiate distribution of the reward. The reward may be a physical accessory to the plush creature (e.g., glasses, a hat, etc.) that may be shipped to the recipient.

FIG. 1 illustrates a block diagram of an example of toy system 100, in accordance with some embodiments of the invention. Toy system 100 includes toy object 105. Toy object 105 may include an outer layer covering at least part of or the substantial majority of toy object 105. The outer layer may comprise a fabric, material or textile, such as plush, cotton, rayon, silk, velvet or wool. The outer layer may be soft. Toy object 105 may include an inner material (e.g., a stuffing) comprising, for example, cotton, synthetic fibers, and/or plastic pellets. Toy object 105 may include one or more facial features, such as one or two eyes, noses, lips, ears and/or eyebrows. Toy object 105 may include a material configured to look like hair. Toy object 105 may include one, two or more arms, legs, horns and/or tails. Toy object 105 may resemble a human, an animal, a cartoon character, an inanimate object, and/or a creature (i.e., an imaginary lifeform, such as a monster). Toy object 105 may be less than, more than or about equal to 2, 4, 6, 10, 12, 18, or 24 inches tall.

Figure 2A:
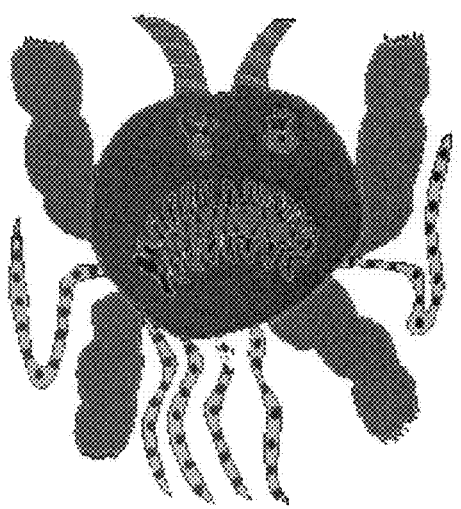
FIGS. 2A-2F show examples of child drawings and toy objects modeled after those drawings, in accordance with some embodiments of the invention.
Figure 2B:
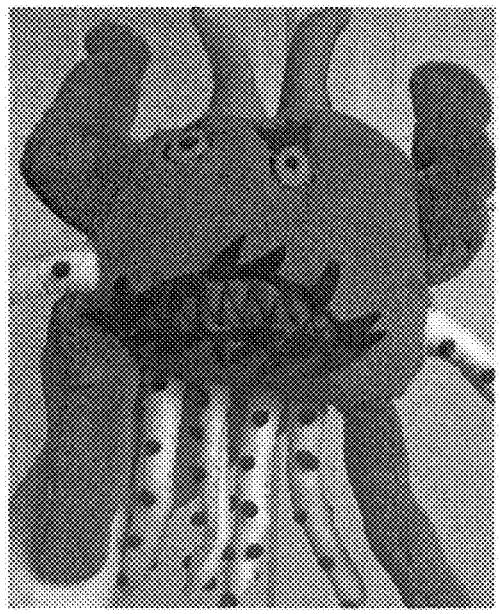
Figure 2C:
Figure 2D:
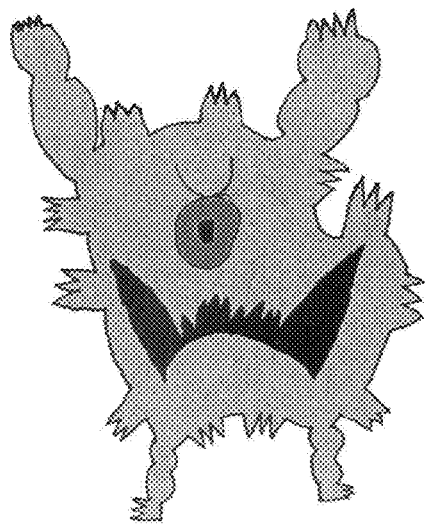
Figure 2E:
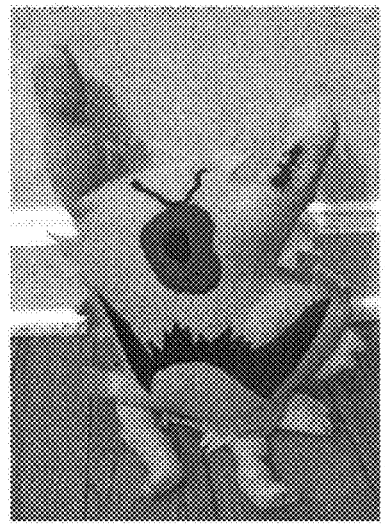
Figure 2F:
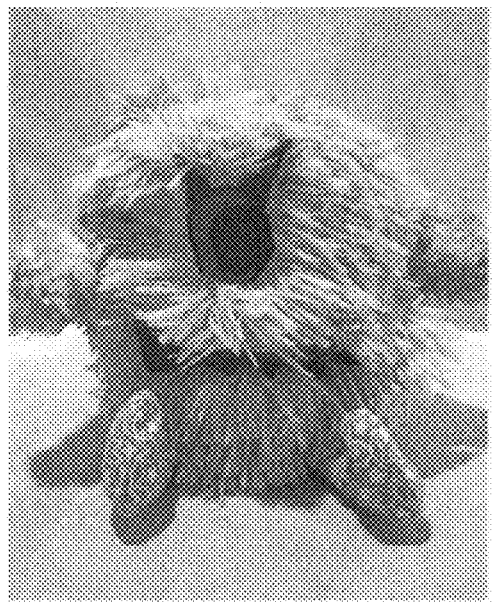

In some instances, a toy object is modeled after a child's drawing. For example, a child may be instructed to draw a creature, a monster, an animal, or a specific or general person. A toy object (e.g., a stuffed toy object) may be made based on the drawing. The drawing may be made by hand or by computer. The drawing may include a black-and-white sketch or a colored drawing. Toy object 105 thus may include colors, proportions, appendages, facial features, and/or shapes similar to those from the drawing. In some instances, a drawing is selected upon a set of drawings to use as a model for toy object 105. The selection may be based on votes. For example, each drawing of a pool of drawings may be shown online and web users (e.g., child web users) may be allowed to vote on their favorite drawing using a user interface and a computer connected to a network. FIGS. 2A and 2D show two examples of child drawings. FIGS. 2B-2F show examples of toy objects modeled after those drawings.

Toy system 100 may include packaging 110. Packaging 110 may include, for example, a plastic or cardboard full or partial encasement of toy object 105. In some instances, packaging 110 is separable from toy object 105, and presented in a manner that an owner would be inclined to discard the packaging while keeping toy object 105. Packaging 110 may initially be attached to toy object (105), for example, using discardable plastic strips or twist ties. In some instances, packaging 110 initially contains toy object 105 but may be cut or opened in order to separate toy object 105 from packaging 110.

Toy system 100 may include one or more tags 115. Tags 115 may be attached to toy object 105. For example, tags 115 may be sewn to attach to toy object 105 (e.g., such that an edge of a tag 115 is in direct contact with a surface of toy object 105). Tags 115 may be attached to toy object via, e.g., a string, plastic strip, etc. For example, a tag 115 may have a hole in it. A string may extend through the hole and wrap around or attach to a portion of toy object 105.

Tags 115 may comprise a paper or cloth material. Tags 115 may include textual and/or graphical print or writing.

Toy system 100 may include one or more inserts 120. Inserts 120 may be included inside packaging 110. Inserts 120 may comprise a material such as wood, paper, metal or cardboard. Inserts 120 may be separate from (i.e., not physically attached to) toy object 105 and/or packaging 110. In some instances, one or more inserts comprise a card or a plaque. Inserts 120 may include a card, note or printed paper inside an envelope.

Information (e.g., printed information) may be provided. For example, the information may be printed, sewn, stamped or written on one or more of packaging 110, tags 115, inserts 120, some other component provided with toy object 105, and the toy object 105 itself. The information may include, for example, a general name of toy object 105 (e.g., "Promise Monster"), a specific name of toy object 105 (e.g., "Octotron", "Spike" or "Chuck"), a manufacturing company, contact information (e.g., an address, phone number or email address) of the manufacturing company, washing instructions, use instructions, warnings, testimonials and/or a website.

One or more of packaging 110, tags 115 and inserts 120 may also include positive message 125, task identifier 130, and/or reward code 135, each of which is discussed in further detail below.

In some embodiments, toy system 100 includes positive message 125. In some instances, toy system does not include positive message 125. Positive message 125 may be presented on a surface of toy object 105. For example, positive message 125 may be sewn onto a stomach region of toy object 105. Positive message 125 may also or alternatively be presented on a tag 115 or an insert 120.

Positive message 125 may relate to a future, current or past feeling, emotion, relationship or act. In some instances, positive message relates to the future and includes a promise. The promise may be in regards to a feeling or a general act (e.g., a promise to love the recipient or to support the recipient). Positive message 125 may include an explicit or implicit "I" and/or "you", such that, for example, a recipient would likely construe the message as being either from a purchaser to the recipient or from toy object 105 to the recipient. Positive message 125 may include a message intended to improve: a social tie between a purchaser and a recipient, a recipient's attitude, a recipient's self-confidence, and/or a recipient's outlook. Examples of positive messages 125 include: "I promise you're tough enough", "I promise to always love you", "I promise that things will get better", "I promise to always be proud of you", and "I promise to always be there for you". Promises may target a particular demographic (e.g., promises designed to be from military families to a military member, or promises designed to be from an adult or family member to a child), or promises may include a more general, wide-appealing promise.

Figure 3A:
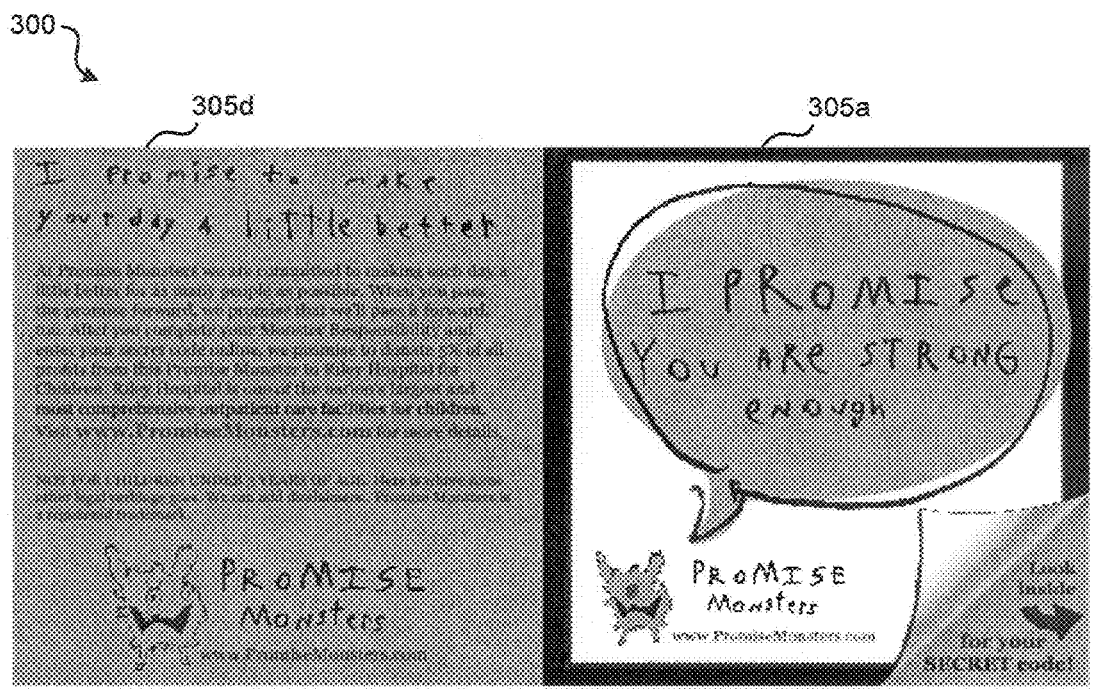
FIGS. 3A and 3B show an example of a folded insert comprising positive message, in accordance with some embodiments of the invention.
Figure 3B:
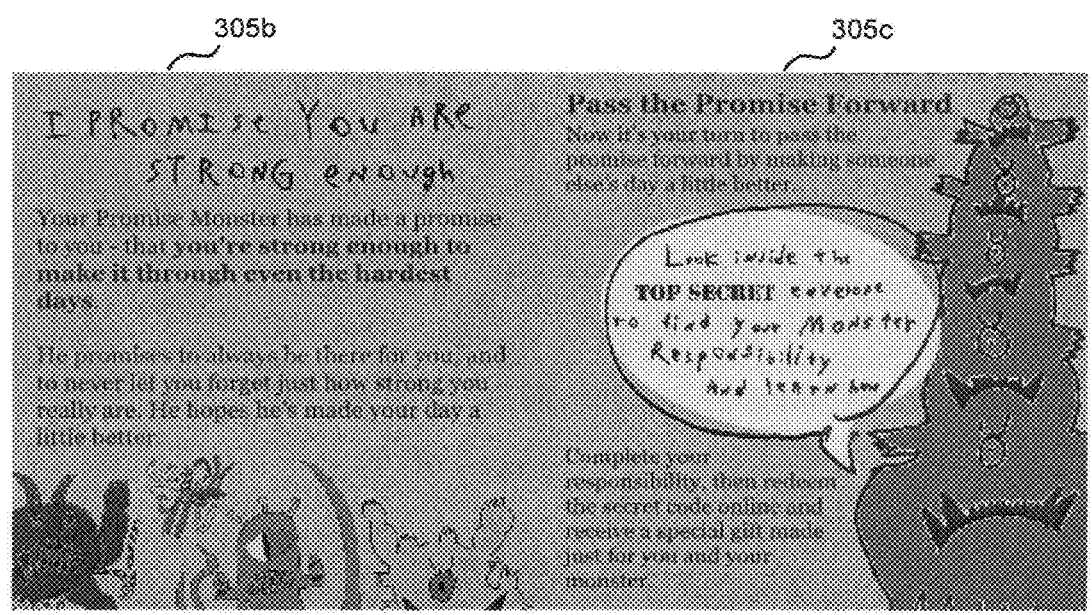

FIGS. 3A and 3B show an example of a folded insert 300 comprising positive message 125. FIG. 3A illustrates an example of a front 305a and a back page 305d of folded insert 300, in accordance with some embodiments of the invention. FIG. 3B illustrates an inside left page 305b and an inside right page 305c of the insert 300, in accordance with some embodiments of the invention. Front page 305a and inside left page 305b indicate the promise to the recipient. Insert 300 also refers to another insert with task identifier 130 and reward code 135.

Figure 3C:
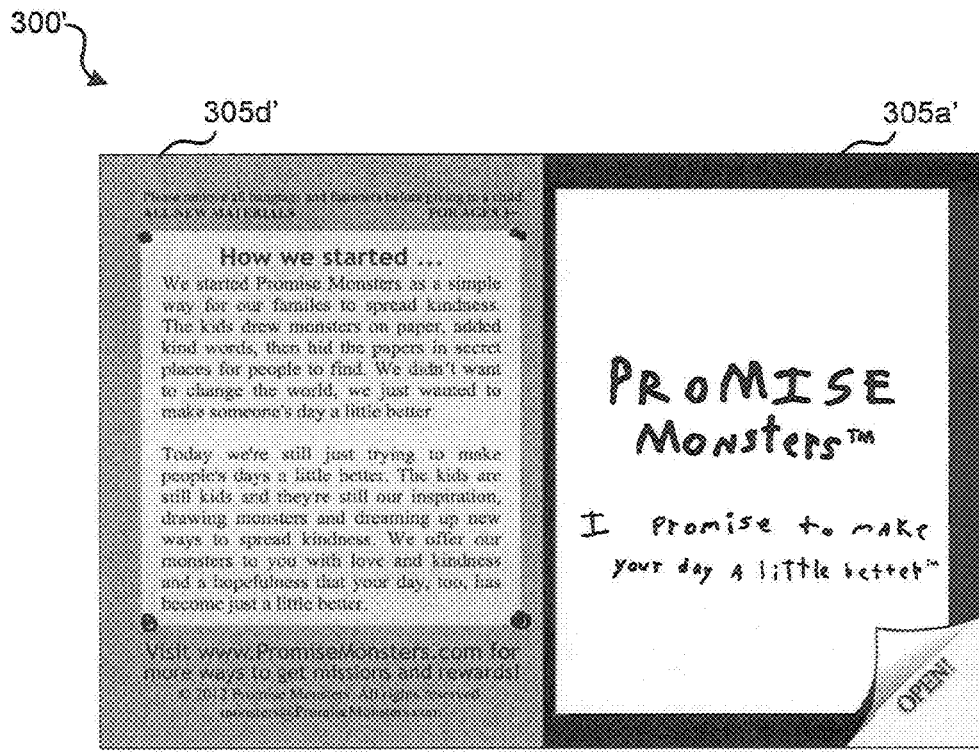
FIGS. 3C and 3D show an example of a folded, in accordance with some embodiments of the invention.
Figure 3D:
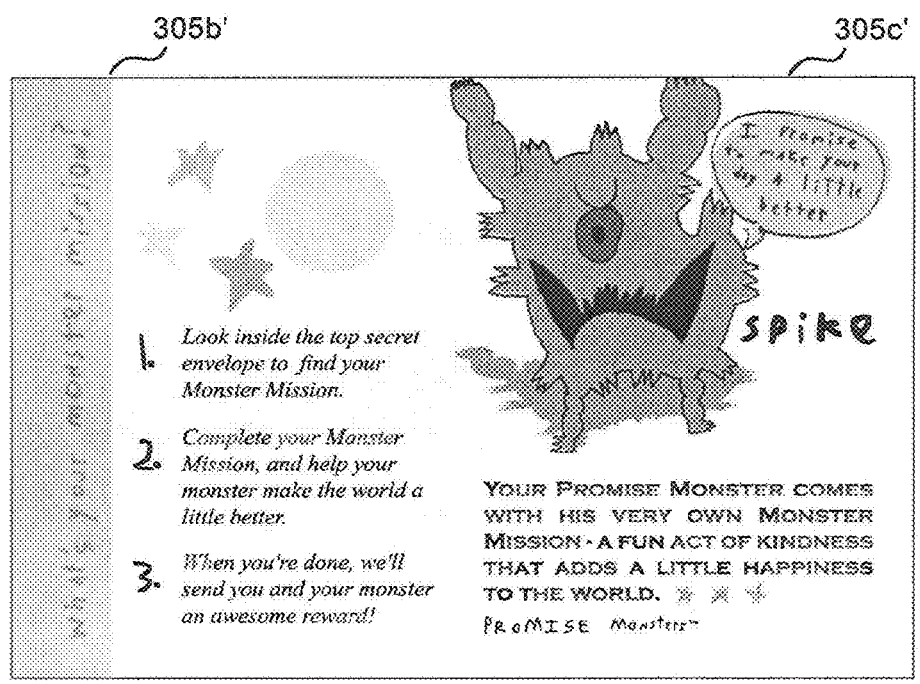

FIGS. 3C and 3D show another example of a folded insert 300' that includes a briefer positive message 125 than insert 300. FIG. 3C illustrates an example of a front page 305a' and a back page 305d' of folded insert 300', in accordance with some embodiments of the invention. FIG. 3D illustrates an inside left page 305b' and an inside right page 305c' of the insert 300', in accordance with some embodiments of the invention. Inside left page 305a' indicates a brief promise to the recipient. Insert 300' also refers to another insert with task identifier 130 and reward code 135.

Toy system 100 may include one or more task identifiers 130. Task identifier 130 may identify a task that a recipient is to perform. The task may include, e.g., an act of good-will, an act of social responsibility and/or a humanitarian task, intended to benefit other people. In some instances, the task identifies an action and identifies a set number of people that the recipient must perform the action for. For example, the task may indicate that the recipient must tell five people that he loves them. The task may relate to a verbal communication or a physical act (e.g., shoveling another person's side-walk). In some instances, the task may relate to a vague instruction (e.g., "Say something nice to five strangers.") The task may identify particular people or a particular group of people for the act (e.g., "Tell your family members that you love them") or not. Examples of tasks that may be identified by task identifier 130 include: "Write a letter to 5 people who need cheering up", "Compliment 5 strangers", "Volunteer five hours at a hospice, senior citizen center, or hospital", "Commit five random acts of kindness", "Help five people make it through a rough time", "Send a care package, letter, or card to someone having a hard time", "Be there for five strangers by helping them have a better day", and "Send a letter to someone you love telling them that you love them".

In some instances, a task is related to a topic of positive message 125. For example, positive message 125 may include a statement "I will always love you", and the task may instruct the recipient to tell five people that he will always love them. Each positive message 125 that may be associated with toy object 105 may be associated with one or more tasks. Thus, in some instances, a purchaser of toy system 100 who knows what positive message 125 conveys (e.g., because he can see it on toy object 105) will not know what task is identified until he or a recipient views the task identifier (which may be concealed).

Tasks may include a task with no or little possibility of a reward-distributing company tracking whether a recipient actually performed the task. For example, a task may include "Compliment 5 strangers". Thus, a reward-distributing company may need to rely on a recipient's honesty regarding whether he performed the task. Alternatively, a task may include a tracking mechanism. For example, the task may indicate that the recipient must gather email addresses of people who benefited from the tasks to enter into the website. An email may be sent to those people to confirm that the act was performed. As another example, the task may relate to one that is to be performed with or for one or more specific organizations. These organizations may then be able to confirm (e.g., to a reward-distributing company via an online communication) that the recipient performed the task.

As noted above, task identifier 130 may be presented on packaging 110, a tag 115, and/or an insert 120. In some instances, a recipient is instructed to view a website (e.g., one requiring a log in, one requiring a code entry, a toy-object-associated website, a publicly viewable webpage, etc.) in order to view task identifier 130. Thus, task identifier 130 may include text or graphics representing the task and presented on a webpage.

Toy system 100 may include code 135. Code 135 may include one or more characters (e.g., numbers and/or letters) or one or more strings of characters which a person (e.g., recipient of toy object 105) may enter into a website to identify himself, identify toy object 105, identify a purchase of toy object, identify a task associated with toy object, etc. Code 135 may be accompanied by instructions about how to use the code 135. For example, the instructions may identify a website, may indicate that the user may input code 135 to the website, may indicate an effect of entering code 135 to the website (issuance of or credit towards issuance of a reward), may indicate a condition which should be met prior to entering code 135 to the website.

The webpage may be hosted by a company manufacturing or selling toy system 100 and/or distributing rewards. The webpage may request information from and/or about the recipient (e.g., his address, email address, etc.) and/or about a parent of the recipient in addition to requesting code 135. In some instances, recipient is instructed (e.g., by accompanying instructions) only to use code 135 upon completion of a task identified by task identifier 130.

Entering a code may have an effect of: updating an online profile (e.g., associated with the recipient), advancing the recipient in progress towards obtaining a reward, causing a reward to be issued (e.g., to the recipient and/or to another entity, such as a guardian of the recipient, a donee, a person in need, a charity, etc.), etc. In some instances, entering one or more codes results in a reward being sent to a recipient and/or to a charity.

Part or all of the reward may or may not be identified to the recipient prior to successful entry of the code. For example, a task-identifying insert or a packaging could identify a reward or a set of rewards (each being obtainable or one of which is obtainable).

The reward may include a tangible item, a discount, a gift certificate, an opportunity, or a message. Example rewards include: a free or discounted toy object, an accessory for toy objects 105 (e.g., dumbbells that attach to a toy object's hands, a band-aid that covers a toy object's wound, a mini-creature that attaches to a toy object, or a Velcro-on heart), money or items (e.g., food) to donate, the opportunity to choose a charity for a donation, or other items. The reward may depend on the type of task identified by task identifier 130, a task completed by a recipient, a degree of completion by a recipient, past completions of tasks by a recipient, completion of tasks by other recipients and/or other factors. For example, a reward may include a $1 donation for each person (capped at 10) that a recipient compliments.

Toy system 100 may include a concealor 140. Concealor 140 may conceal task identifier 130 and/or code 135. Thus, for example, a purchaser intending to give toy system 100 to a recipient may not know what task is included in the system. Even if the purchaser knew of a task associated with a similar system with a similar toy object 105, because a plurality of tasks may be associated with a single toy object 105 and/or a single positive message 125, the purchaser may still be unable to determine the task prior to purchasing toy system 100 and removing concealor 140.

In some instances, packaging 110 comprises concealor 140. Thus, while a purchaser may be able to view toy object 105, he may be unable to see an insert covered by opaque packaging portions that includes task identifier 130 and/or reward code 135. In some instances, concealor 140 comprises an envelope, e.g., containing an insert 120. Concealor 140 may include a secret-identifying (e.g., "Top Secret") seal or stamp.

Toy system 100 may include other non-depicted features. For example, toy system 100 may include a picture book, a coin or multiple toy objects 105 per system 100.

Figure 4A:
FIGS. 4A and 4B show examples of an insert comprising task identifier, in accordance with some embodiments of the invention.
Figure 4B:
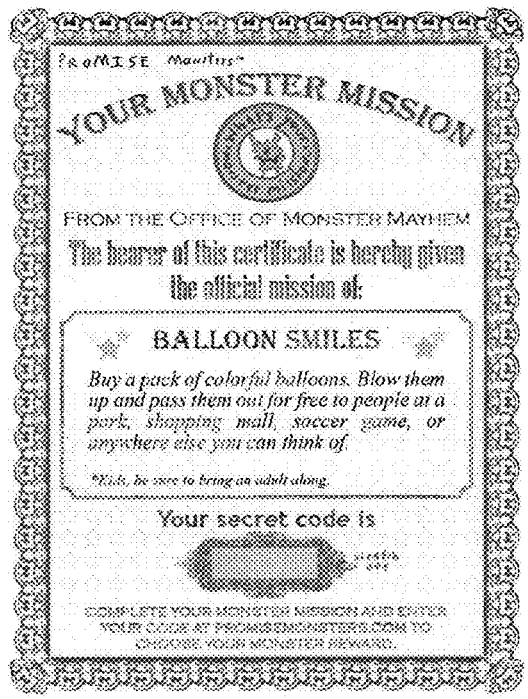

FIGS. 4A and 4B each illustrate an example of an insert comprising task identifier 130, in accordance with some embodiments of the invention. The insert also has a location where code 135 would be displayed. The insert also provides instructions about how to use code 135 to redeem a reward.

Figure 5:
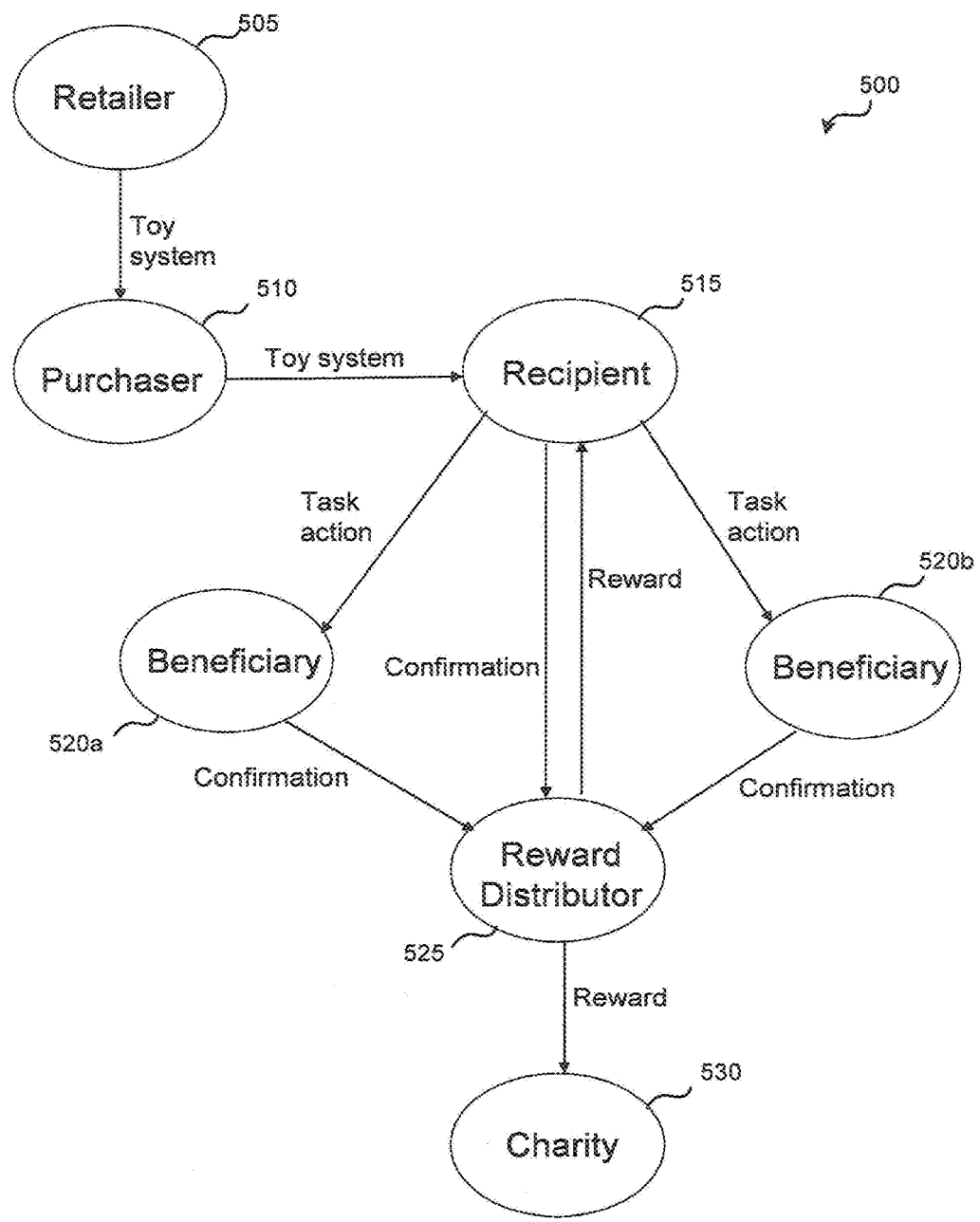
FIG. 5 illustrates an example of interactions between various parties involved in actions relating to toy system.

FIG. 5 illustrates an example of interactions between various parties involved in actions relating to toy system 100. Retailer 505 sells toy system 100 to purchaser 510. Purchaser 510 may give toy system 100 to recipient 515. In some instances, recipient 515 purchases toy system 100 directly without the involvement of a separate purchaser 510. In some instances, recipient 515 then receives positive message 125, which may include a promise from toy object 105 or from purchaser 510 to recipient 515.

Toy system 100 may convey to recipient 515 one or more tasks via one or more task identifiers 130. Task identifier may be immediately visible (e.g., on a package of toy system 100), or a recipient may need to manipulate packaging, envelopes, etc. to view to task identifier 130. Completion of the task(s) may benefit one or more ascertainable or non-ascertainable beneficiaries, such as beneficiary 520a and 520b. In some instances, completion of the task benefits society generally (e.g., by reducing pollution).

Upon completion of all or part of the task, recipient 515 and/or one or more beneficiaries 520 may send a confirmation of the completed task action to reward distributor 525. In some instances, reward distributor 525 comprises a manufacturer of toy system 100. The confirmation may include entry of one or more codes 135. The confirmation may be sent, for example, online using a webpage or over the phone.

The confirmation may include information identifying the specific toy system involved and/or a specific recipient. In some instances, unique codes 135 inherently identify the specific toy system. The confirmation may also include personal information related to recipient 115 and/or personal or company information related to a beneficiary 520. A webpage may further provide options for recipient 515 to select a reward among a plurality of options. For example, recipient 515 may be able to choose a toy-object accessory among a list of accessories. A webpage may also provide an option to allow recipient 515 to select a charity receiving all or part of the reward.

Reward distributor 525 may update a profile associated with the toy system and/or recipient upon receiving the confirmation(s). For example, the profile may be updated to indicate that a particular task was estimated to have been completed, that a task generally was estimated to have been competed, a confirmation receipt time (e.g., date or time of day), an estimated task-completion time, etc.

Reward distributor 525 may identify reward criteria. Reward criteria may be defined by reward distributor 525 or by a third party. Reward criteria may include a task-completion status, a threshold number of tasks to be completed, completion of one or more tasks within a time period, etc.

Reward distributor 525 may compare task-completion data to the reward criteria. In one instance, the reward criteria is completion of a task. It is estimated that the task was completed upon entry of a code (e.g., a unique or non-unique code), and the criteria would then be met. In one instance, the reward criteria is completion of five tasks. Entry of a code may result in crediting a recipient's account, having estimated that one of the tasks was completed. The reward distributor 525 may compare a number of completed tasks in the recipient's account to the threshold to determine if the criteria was met. In another instance, the reward criteria is completion of a set of specific tasks. Each task may be associated with a unique code, or the user may provide input identifying which task was completed. Entry of these inputs may result in an estimate that a specific task was completed, and a recipient's account may be updated. The reward distributor 525 may compare data from the recipient's account identifying the completed tasks to the criteria to determine whether the criteria was met.

In some instances, multiple criteria are used. Criteria may be specific to, e.g., a type of toy object, previously obtained rewards, specific tasks completed, a number of tasks completed, etc. For example, a recipient may be provided with five tasks. A first reward may be available if it is estimated that the recipient performs three tasks, and a second reward may be available if it is estimated that the recipient performs all five tasks.

Upon determining that the reward criteria was met, reward distributor 525 initiates a providing of one or more rewards to recipient 515 and/or a charity or individual in need. For example, reward distributor 525 may send an electronic notification to a shipping center. As another example, reward distributor 525 may confirm shipment of the reward with the recipient 515.

Figure 6:
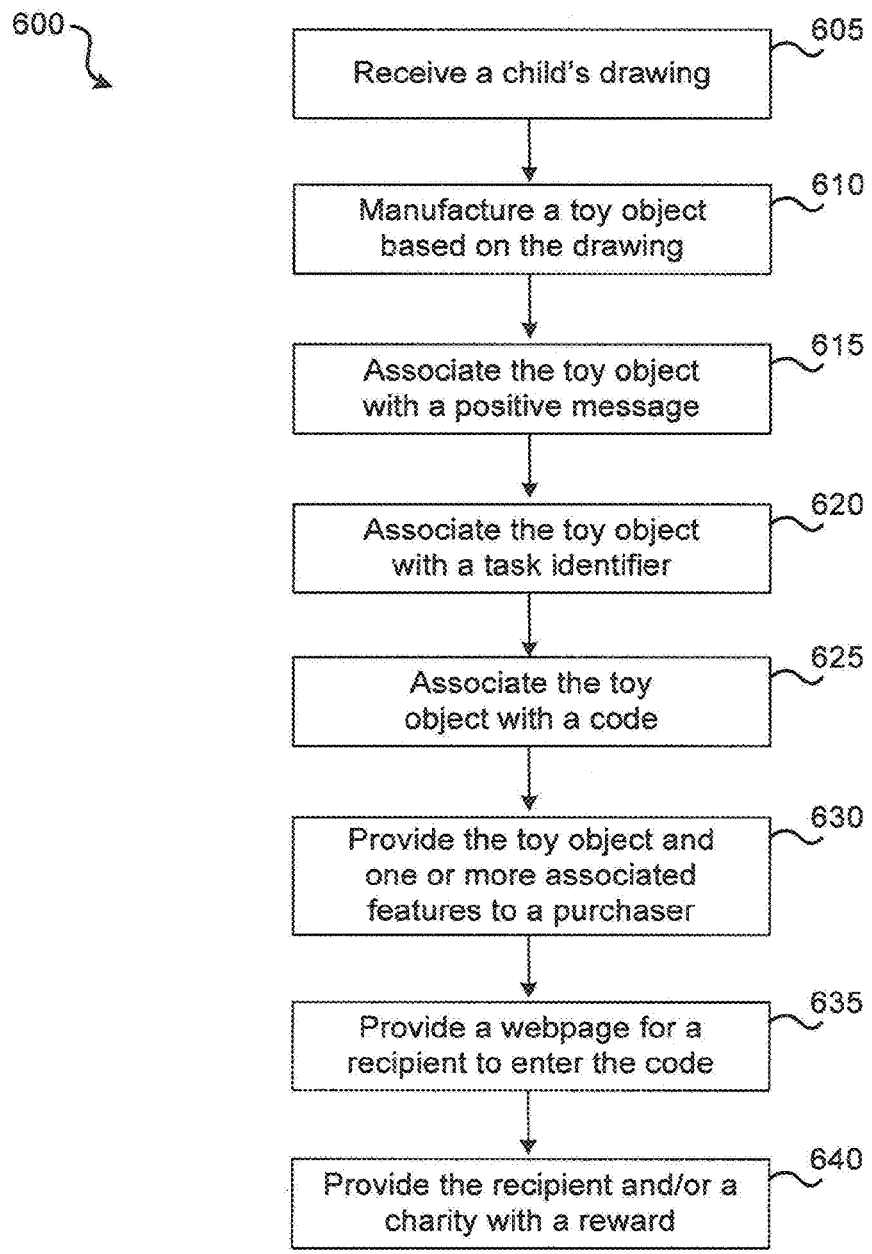
FIG. 6 illustrates a flowchart depicting method for issuing rewards and/or promoting kind acts, in accordance with some embodiments of the invention.

FIG. 6 illustrates a flowchart depicting method 600 for issuing rewards and/or promoting kind acts, in accordance with some embodiments of the invention. At 605, a child's drawing is received. As described above, the drawing may be a drawing of a monster. The drawing may be selected based on particular criteria (e.g., monster-like but friendly) and/or based on votes. At 610, toy object 105 is manufactured based on the drawing. Toy object 105 may include similar features, proportions and colors as those depicted in the drawing. At 615, toy object 105 is associated with positive message 125. In some instances, the positive-message association is part of the manufacture of toy object 105. For example, a positive message may be sewn into a part of toy object 105 and/or written on a tag attached to toy object 105. Alternatively, a package insert 120 may show positive message 125. In some instances, toy object 105 is not associated with positive message 125.

At 620, toy object 105 is associated with one or more task identifiers 130. The task identified by task identifier 130 may relate to content in positive message 125. At 625, toy object 105 is associated with one or more codes 135. The one or more codes 135 may be specific to a type of toy object (e.g., a style of plush creature), a specific toy object (e.g., unique amongst all distributed toy objects), a task, etc. Thus, one toy object associated with five tasks may have, e.g., five different codes or one code, and the codes may or may not be unique to the toy object. As described above, an insert 120 may comprise task identifier 130 and/or code 135.

At 630, toy object 105 and one or more associated features (i.e., positive message 125, task identifier 130, and/or reward code 135) is provided to a purchaser. The purchaser may be one who intends to give a purchased toy object 105 and one or more associated features to a recipient. In some instances, toy object 105 and one or more associated features are provided to a purchaser who does not intend to give toy object 105 and one or more associated features to a recipient and intends to enjoy and/or use the purchased set himself.

At 635, a webpage is provided. The webpage may have a form field for a recipient to enter code 135. The webpage may also include other fields, such as identifying fields (e.g., name, address, phone, email, age, and/or parent's name) and reward-related fields (e.g., reward selection, charity selection, task completed, and/or degree of task completion).

The webpage may also provide tracking of benefits provided as a result of one or more toy systems 105. For example, the webpage may include a counter of the number of successfully completed tasks, in total, or by a particular user and/or of the number of toy systems 100 purchased. The webpage may include a map with indicators of where task actions have been performed.

In some instances, the webpage may be configured to allow recipients to log in using accounts. This could allow tracking of multiple task completions. In some instances, the webpage may itself identify other tasks that the recipient may perform (and potentially receive rewards for performing). As described above, in some instances, a third party (e.g., a supervising organization) and/or a beneficiary may enter information into the webpage to confirm full or partial task completion. At 640, a reward is provided to the recipient and/or a charity or person in need. In some instances, an electronic message is sent to a distributor to indicate that the recipient and/or charity is to be provided with the reward.

Figure 7:
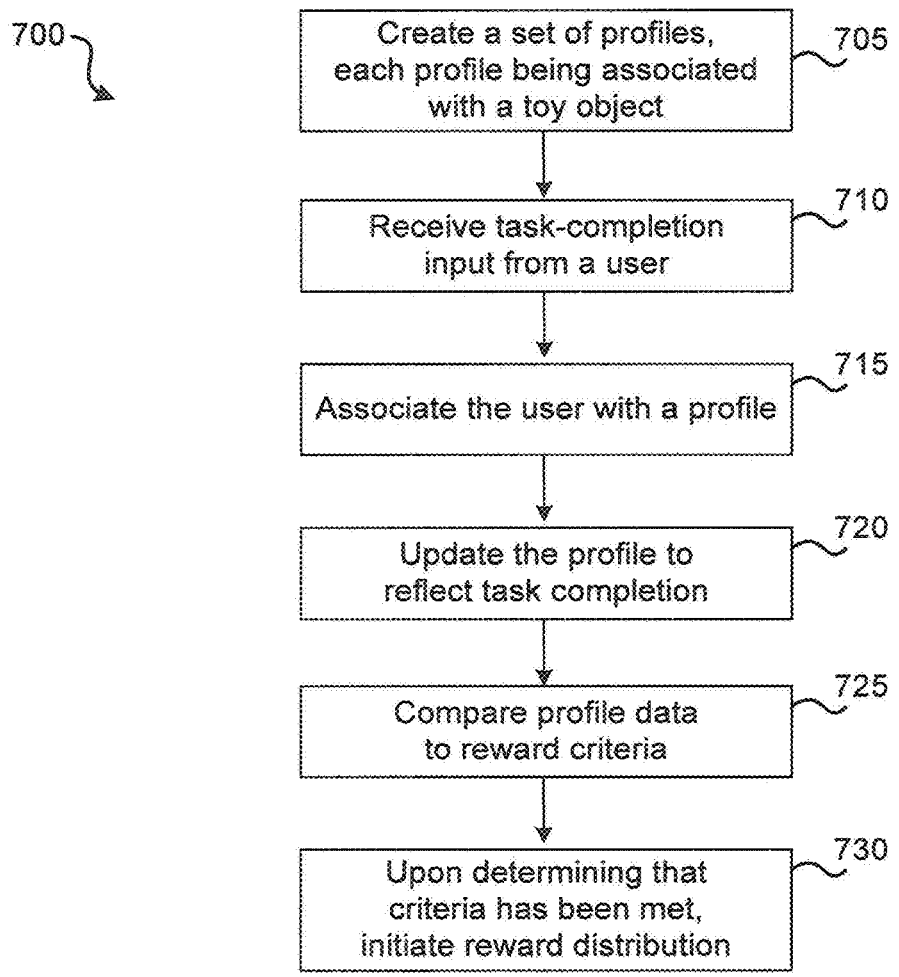
FIG. 7 illustrates a flowchart depicting method for issuing rewards and/or promoting kind acts, in accordance with some embodiments of the invention.

FIG. 7 illustrates a flowchart depicting method 700 for issuing rewards and/or promoting kind acts, in accordance with some embodiments of the invention. At 705, a set of profiles is created. A profile may include, e.g., a type of toy object (e.g., a type of creature) and/or a specific toy object (e.g., identified by a unique number associated with the toy object). A profile may further include recipient and/or purchaser information (e.g., a name, address, telephone number, age, etc.). A profile may include log-in information (e.g., a log-in name and a password). A profile may include an e-mail address. A profile may identify a date of purchase of the toy object. A profile may identify an online history of a user associated with the profile.

A profile may include task-completion data. The task-completion data may include a number, a characteristic, and/or an identity of one or more tasks associated with the toy object. The task-completion data may include a number, identity or type of tasks previously estimated to have been completed and/or dates of estimated completion or of the estimations. Task-completion data may include codes previously input by the user to indicate that one or more tasks had been completed.

A profile may include reward information. Reward information may include reward criteria, such as a number, type and/or identity of tasks to be performed to earn a reward. For example, reward criteria may include: completion of five tasks; completion of the task "Saying hello to a stranger"; etc. Reward information may include one or more rewards associated with the toy object. In one instance, a recipient may be able to choose between multiple rewards. In one instance, different rewards are available depending on which and/or how many tasks were estimated to have been completed. In one instance, only one reward is available. The reward may be a physical reward that is represented, e.g., based on text (e.g., "Sunglasses"), pictures, and/or a unique reward identifier.

For example, a profile may include: a type of toy object (e.g., "Blue creature"), a number uniquely associated with the toy object (e.g., 17839), tasks associated with the toy object ("Say hello to five strangers"; "help clean the house"); completed tasks ("Say hello to five strangers"—complete; "help clean the house"—incomplete); a number of completed tasks (e.g., 1); reward criteria (e.g., completion of all tasks); reward (one of: sunglasses or hat); a purchase date (e.g., Sep. 7, 2010); a login name (e.g., "Stephanie"); a password (e.g., "password"); etc.

Profiles may be initially created as toy objects are produced, toy objects are sold, recipients register with a website, a code associated with a toy object is first entered into the website, etc.

At 710, task-completion input is received from a user. The task-completion input may include a code. The task-completion input may include selection of options presented on a website. In one instance, a user can log into a website and then select an option or enter information indicating that a task had been completed.

At 715, the user is associated with a profile. The user may be associated with the profile based on, e.g., login information, a code that was entered, selected website options, etc. For example, each toy object produced may be associated with one or more unique codes. Entry of one of these codes may therefore allow the toy object and a profile associated with the toy object to be identified. In instances in which no profile is yet associated with the user and/or code, a new profile may be created.

At 720, the profile is updated to reflect estimated task completion. In one instance, the profile includes identifiers of specific tasks (e.g., unique task numbers relating to each task, or text identifying each task). The task-completion input may indicate which task was completed, and the profile may be updated to reflect the specific completion. In one instance, the profile is updated to increase a count of completed task. In one instance, the profile is updated to change a binary task-completion identifier (e.g., from "Incomplete" to "Complete").

At 725, profile data is compared to reward criteria. The reward criteria may be reward criteria identified in the user-associated profile, reward criteria identified based on profile data (e.g., associating a type of toy object with specific reward criteria), or general reward criteria (e.g., one task must be completed). In some instances, the profile data is compared to multiple reward criteria. Comparing the profile data to the reward criteria may include, e.g., comparing a number of estimated task completions to a threshold, determining whether a specific set of tasks had been estimated to have been completed, etc.

At 730, reward distribution is initiated upon determining that the reward criteria had been met. For example, the user may be informed (e.g., via a webpage or an email) that he qualified for a reward; a request may be sent (e.g., via a webpage or email) to the user for a shipping address or reward selection; an electronic message may be sent to a shipping distribution center; a virtual reward may be sent to the user (e.g., via the webpage or email), etc.

FIGS. 6 and 7 and other embodiments of the invention disclosed herein disclose a webpage to receive code 135.

Alternatively, a paper form or a phone number may be provided and used. A recipient receives a form requesting information as described with reference to the webpage. Similarly, an operator may request information as described with reference to the webpage.

A single entity may perform all parts of method 600 or multiple entities may perform various parts. For example, a first entity may manufacture toy object 100 and associate toy object with positive message 125, task identifier 130 and reward code 135; a second entity may provide the toy object and one or more associated features to a purchaser; a third entity may provide the webpage for a recipient to enter the reward code; and a fourth entity may provide the recipient and/or a charity with a reward. A single entity may perform all parts of method 700 or multiple entities may perform various parts.

In some instances, a plurality of toy systems 100 may be associated with a particular charity or organization. That organization may, for example, then receive full or partial rewards upon recipients' completions of tasks. In one instance, specific toy objects 105 are associated with the charity or organization, such that purchasers can easily identify toy systems 100 benefiting the charity or organization.

Figure 8:
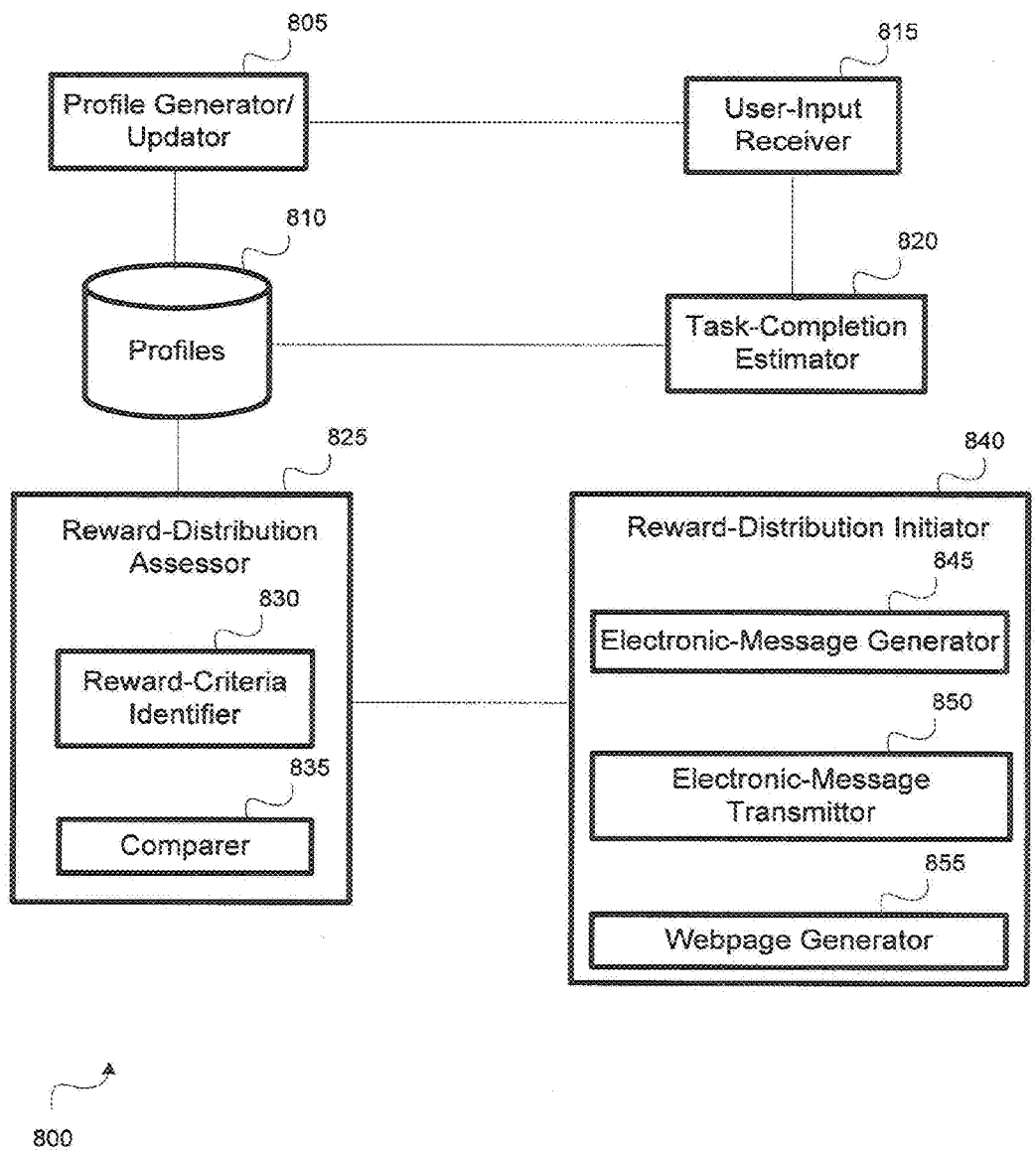
FIG. 8 shows a block-diagram of a system for issuing rewards and/or promoting kind acts, in accordance with some embodiments of the invention.

FIG. 8 illustrates a block-diagram of a system 800 for issuing rewards and/or promoting kind acts, in accordance with some embodiments of the invention. A profile generator/updator 805 may generate and/or update database or a set of profiles 810. Each profile may be generated, e.g., as a toy object associated with the profile is manufactured or sold, once a user logs into an associated website, once a user registers the toy object on the website, once a user inputs a code (e.g., a task-completion code or a toy-object identifier code) into the website, etc. Each profile may include information as described herein. For example, a profile may include a toy-object identifier, task-completion status, and reward criteria. Profile data may be stored in a single database or in multiple databases.

System 800 may include a user-input receiver 815. User-input receiver 815 may utilize a network, such as the Internet, to receive input entered by a user onto a webpage. The user may be, e.g., a recipient of a toy object, a purchaser of a toy object, or a beneficiary of a task. The input may include, e.g., a code (e.g., a task-completion code). The received input may be used by profile generator/updator 805 to identify and, in some instances, update a profile. In some instances (e.g., when a profile is only created after a user accesses a website in a particular manner), a profile may be created based at least partly on the received input. The profile may be generated and/or updated to include task-completion information. For example, the profile may be updated to include a "Completed" status for a task or an increased count of task completions.

Using received input and/or data from an identified profile, task-completion estimator 820 may estimate whether one or more tasks have been completed. Task-completion estimator 820 may specifically estimate a number of tasks completed, specific tasks completed, etc. In some instances, a task is estimated to have been completed if a user enters an appropriate code associated with the task completion. Task-completion estimator 820 may rely on a user's truthful input in making its estimate.

System 800 may include a reward-distribution assessor 825. Reward-distribution assessor may include a reward-criteria identifier 830. Reward-criteria identifier 830 may identify one or more reward criteria. The identification may be made, e.g., by looking up the criteria in a profile, using one or more stored criteria, calculating a criteria based on an algorithm, etc. Reward-distribution assessor 825 may further include a comparer 535. The comparer may compare task-completion data (e.g., stored in a profile 810 and/or determined by task-completion estimator 820) to reward criteria identified reward-criteria identifier 830. Comparer may determine whether, e.g., a threshold number of tasks were completed (e.g., one task, five tasks, etc.), whether the tasks were completed to a sufficient level, whether one or more specific tasks were completed, etc. Based on the comparison, reward-distribution assessor 825 may identify one or more rewards for which the reward criteria was met.

System 800 may include a reward-distribution initiator 840. Upon a determination that one or more reward criteria were met, reward-distribution initiator 840 may initiate distribution of one or more rewards. The reward may be a physical reward (e.g., to be shipped to a recipient or other party) or a virtual reward (e.g., access to part of a website). In some instances, the reward is a monetary reward (e.g., sent to a recipient or other party, such as a charity).

Reward-distribution initiator 840 may initiate the reward distribution by obtaining information from a user or recipient. For example, reward-distribution initiator 840 may request a recipient's shipping address, selection from a plurality of reward options, confirmation that a recipient wishes to receive a reward, etc. In some instances, a recipient will be asked to pay for shipping of the reward. Reward-distribution initiator 840 may also or alternatively send reward-distribution information to a reward-distribution center, e.g., instructing the center to send a reward to the recipient.

Reward-distribution initiator 840 may include an electronic-message generator 845 and/or an electronic-message transmitter 850. The electronic message may include an e-mail or other electronic message that may be sent to a reward receiver (who may be the recipient) or a reward-distribution center. The message may request information or may include information that a reward is to be distributed. Reward-distribution initiator 840 may include a webpage generator 855. Webpage generator 855 may, e.g., generate a website to inform a user that a reward has been earned and/or may request information from the user (e.g., a shipping address, reward selection, confirmation that a reward should be distributed, etc.).

Systems and methods disclosed herein have several benefits. For example, a purchaser purchasing toy system 100 may benefit by knowing that he is sending positive message 125 to the recipient and that completion of the identified task by the recipient can benefit others. Recipient 125 can improve his self-confidence, outlook and/or relationship with the purchaser by receiving toy system 100. Recipient 125 can receive a sense of accomplishment after completing an identified task and may further form or strengthen relationships with others. Recipient 125 may receive a positive reward for task completion, which may serve as reinforcement for performing socially desirable actions. Beneficiaries of the task, as well as charities or individuals receiving part of the reward, may benefit both by the direct benefit received and the knowledge that other parties were attempting to help them. Each party, who may be aware of the network of people involved in toy system 100, may benefit from partaking in a communal activity of helping others.

Figure 9:
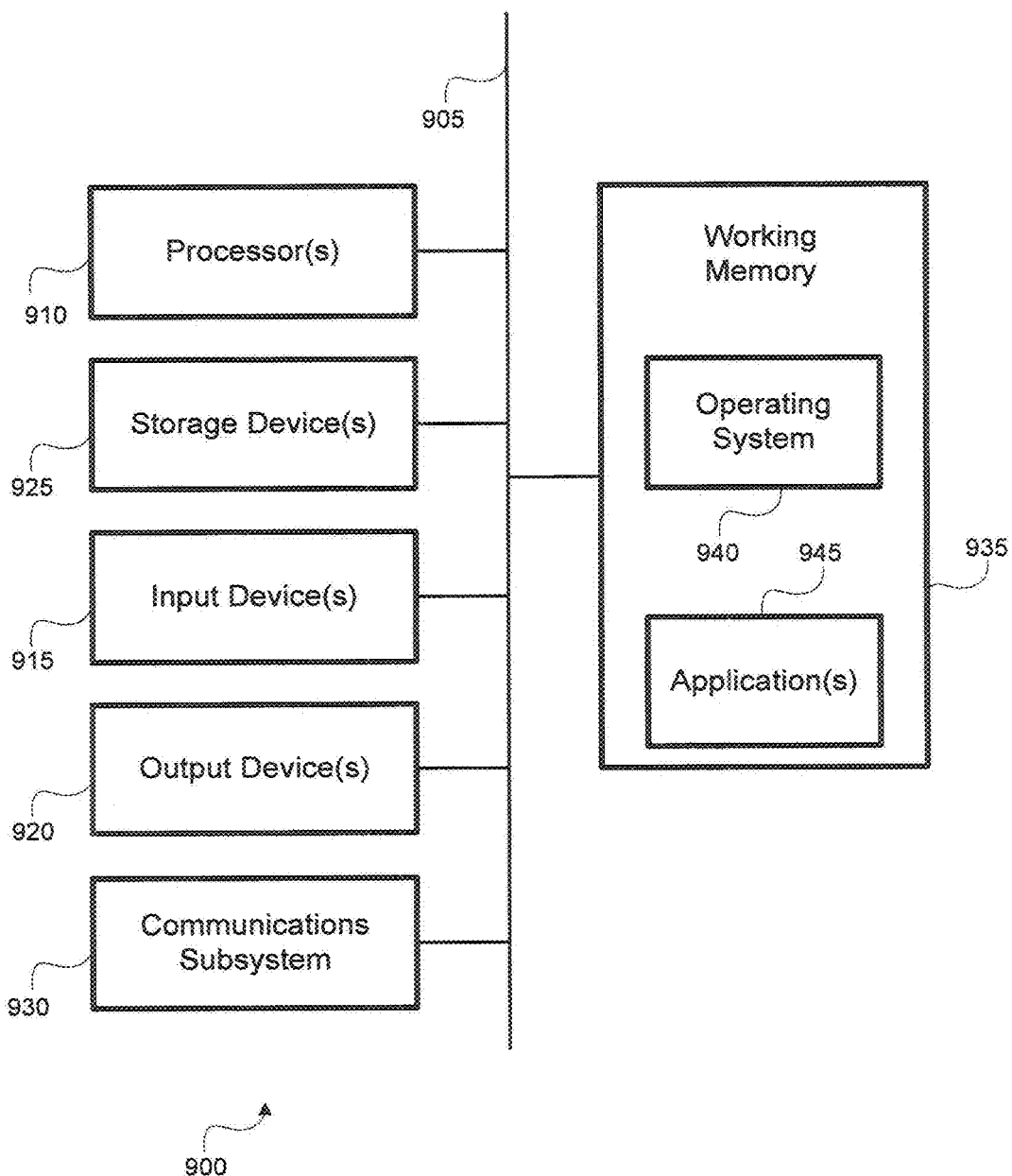
FIG. 9 illustrates an embodiment of a computer system.

FIG. 9 provides a schematic illustration of one embodiment of a computer system 900 that can perform the methods provided by various embodiments, as described herein and/or may include one or more system components as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. For example, a computer system may perform part or all of method 600 or method 700. Further, one or more components of system 800 may (individually or collectively) include a computer system (e.g., computer system 900). According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 900, various computer-readable media might be involved in providing instructions/code to processor(s) 910 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of distributing toy objects, the method comprising:
   simultaneously providing:
      a toy object, the toy object having at least one eye,
      a task identifier that identifies a task, the task including an instruction to perform an action, and
      an identification of a website; and
   receiving, at a computer system via the website, task-completion input from a user;
   estimating, based on the receipt of the task-completion input, that the user completed the task;
   associating the user with a profile, the profile being associated with the toy object; and
   updating the profile to indicate that the task had been performed; and
   tracking a number of tasks estimated to have been completed by the user, such that, upon receipt of the task-completion input, task-completion data reflects an estimation that the user performed the task identified by the task identifier.

2. The method of claim 1, wherein the task-completion input comprises a code, the code being simultaneously provided with the toy object and with the task identifier.

3. The method of claim 1, further comprising:
   identifying a criterion for distributing a reward;

determining whether the criterion for distributing the reward was met by the user completing the task; and upon determining that the criterion for distributing the reward was met, causing the reward to be distributed.

4. The method of claim 3, wherein the reward comprises a physical reward.

5. The method of claim 1, wherein the toy object comprises a plush creature.

6. The method of claim 1, wherein the task is one intended to benefit a person other than the user, and wherein completion of the task is substantially un-verifiable by a party maintaining the website.

7. The method of claim 1, wherein the task includes a verbal act.

* * * * *